US012779959B2

(12) United States Patent
Shimizu et al.

(10) Patent No.: US 12,779,959 B2
(45) Date of Patent: Nov. 3, 2026

(54) GLASS RUN

(71) Applicant: TOYODA GOSEI CO., LTD., Kiyosu (JP)

(72) Inventors: Yasuhiro Shimizu, Kiyosu (JP); Masatoshi Nojiri, Kiyosu (JP); Tasuku Ishiguro, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 332 days.

(21) Appl. No.: 18/583,152

(22) Filed: Feb. 21, 2024

(65) Prior Publication Data

US 2024/0300304 A1 Sep. 12, 2024

(30) Foreign Application Priority Data

Mar. 9, 2023 (JP) ................................ 2023-036298

(51) Int. Cl.

*B60J 10/50* (2016.01)
*B60J 5/04* (2006.01)
*B60J 10/76* (2016.01)

(52) U.S. Cl.

CPC ............ *B60J 5/0402* (2013.01); *B60J 10/50* (2016.02); *B60J 10/76* (2016.02)

(58) Field of Classification Search

CPC . B60J 5/0402; B60J 10/50; B60J 10/76; B60J 10/16
USPC ........................................... 296/93; 49/484.1
See application file for complete search history.

(56) References Cited

U.S. PATENT DOCUMENTS

| | | | | |
|---|---|---|---|---|
| 9,027,284 B2 * | 5/2015 | Murree | B60J 10/32 | 49/495.1 |
| 9,694,660 B2 * | 7/2017 | Kameoka | B60J 10/74 | |
| 2005/0003158 A1 * | 1/2005 | Yamasa | B60J 10/17 | 264/177.1 |
| 2006/0218865 A1 * | 10/2006 | Tamaoki | B60J 10/50 | 49/428 |
| 2012/0079772 A1 * | 4/2012 | Mine | B60J 10/76 | 49/490.1 |
| 2013/0305612 A1 * | 11/2013 | Murree | B60J 10/76 | 49/489.1 |
| 2023/0065367 A1 * | 3/2023 | Nojiri | B60J 10/50 | |
| 2024/0208310 A1 * | 6/2024 | Shimizu | B60J 10/15 | |

FOREIGN PATENT DOCUMENTS

| | | | |
|---|---|---|---|
| CN | 114987159 A * | 9/2022 | B60J 10/76 |
| DE | 102016221552 A1 * | 5/2017 | B60J 10/76 |
| EP | 0155641 A2 * | 9/1985 | B60J 10/248 |
| JP | 04012808 A * | 1/1992 | |

(Continued)

OTHER PUBLICATIONS

Google machine translation of JP 808 (Year: 1997).*

*Primary Examiner* — Hilary L Gutman
(74) *Attorney, Agent, or Firm* — Posz Law Group, PLC

(57) ABSTRACT

A glass run has a basic framework with a bottom wall, a vehicle outer side wall, and a vehicle inner side wall, the basic framework being attached to a door frame, and the glass run guides an up and down movement of a door glass, wherein the bottom wall has a door glass lip which protrudes from a door glass surface of the bottom wall and a door glass bulge which is interposed between the bottom wall and the door glass lip, and at least one of the door glass lip and the door glass bulge is harder than the bottom wall.

5 Claims, 5 Drawing Sheets

(56) References Cited

FOREIGN PATENT DOCUMENTS

| | | | | | |
|---|---|---|---|---|---|
| JP | 09104236 | A | * | 4/1997 | |
| JP | 2002240649 | A | * | 8/2002 | .............. B60J 10/24 |
| JP | 2003252064 | A | * | 9/2003 | |
| JP | 2006193053 | A | * | 7/2006 | |
| JP | 2009001144 | A | * | 1/2009 | |
| JP | 2009029332 | A | * | 2/2009 | |
| JP | 4548458 | B2 | * | 9/2010 | |
| JP | 2012153278 | A | * | 8/2012 | |
| JP | 2013203332 | A | * | 10/2013 | |
| JP | 5339217 | B2 | * | 11/2013 | .............. B60J 10/76 |
| JP | 2018192933 | A | * | 12/2018 | |
| JP | 6614934 | B2 | * | 12/2019 | .............. B60J 10/76 |
| JP | 2021-024388 | A | | 2/2021 | |
| JP | 2021178573 | A | * | 11/2021 | .............. B60J 10/86 |
| JP | 2024091413 | A | * | 7/2024 | |

* cited by examiner

GLASS RUN

CROSS REFERENCE TO RELATED APPLICATION

This application claims the priority benefit of Japanese Patent Application No. 2023-036298 filed on Mar. 9, 2023. The entirely of the above-mentioned patent application is hereby incorporated by reference herein and made a part of this application.

BACKGROUND OF THE INVENTION

(1) Field of the Invention

The present invention relates to a glass run attached to a door frame formed on a door of a vehicle such as an automobile.

(2) Description of Related Art

Improving quietness of a vehicle such as an automobile increases comfort of a passenger and thus, a degree of appeal for improving product competitiveness is higher. In an electric automobile expected to spread rapidly in the future, a conventionally installed engine is removed. When an engine sound has been removed, remaining noise is mainly road noise and wind noise. Thus, countermeasures to reduce these noises have been increasingly required.

The wind noise is a sound generated outside a vehicle by wind hitting the vehicle when the vehicle is traveling, passing through the vehicle body and reaching the interior of the passenger compartment. It is known that a door glass near the passenger's ears in the passenger compartment contributes most to the wind noise in the sound transmitting path. Countermeasures, such as increasing a thickness of the door glass and setting an acoustic glass have been implemented, which however causes an increase in weight and cost.

In addition to the door glass, a glass run as a sealing material between the door glass and a door frame may reduce noise in particularly a high frequency range of 1 kHz or higher. A study is being conducted to increase a reduction effect of this type.

As a technique to reduce noise by utilizing the glass run, for example, Japanese Patent Application Laid-Open No. 2021-24388 is known. As illustrated in FIG. 10, a glass run 100 has a basic framework with a bottom wall 200, a vehicle outer side wall 300, and a vehicle inner side wall 400, and is formed in a channel shape (having a substantially U-shaped section). At a tip of the vehicle outer side wall 300, a cover lip 340 is formed in contact with a door glass 600. A vehicle outer seal lip 310 is formed on the vehicle inner side of the cover lip 340 of the vehicle outer side wall 300 and closer to the bottom wall 200, protruding toward the bottom wall 200 and sliding with the door glass 600.

Meanwhile, at a tip of the vehicle inner side wall 400, a first vehicle inner seal lip 410 and a second vehicle inner seal lip 420 are formed toward the bottom wall 200 to slide with the door glass 600. The second vehicle inner seal lip 420 is formed closer to the bottom wall 200 than the first vehicle inner seal lip 410. The first vehicle inner seal lip 410 and the second vehicle inner seal lip 420 are not in contact with each other when sliding with the door glass 600. With a plurality of the vehicle inner seal lips formed as the first vehicle inner seal lip 410 and the second vehicle inner seal lip 420, the transmitting sound coming through the sound transmitting path in the glass run shown on arrow A is increasingly shielded.

SUMMARY OF THE INVENTION

As a technique to reduce noise caused by wind noise, it is possible to reduce vibration by utilizing so-called impedance matching, in which a vibration energy of a door glass efficiently flows to components which are in contact with the door glass and dissipates. However, studies are not being sufficiently conducted on this countermeasure.

The present invention provides a glass run configured to reduce the noise caused by wind noise, with focus on the impedance matching, in which the vibration energy of the door glass efficiently flows and dissipates.

In order to solve the above problem, according to a first disclosed aspect, a glass run having a basic framework with a bottom wall, a vehicle outer side wall, and a vehicle inner side wall, the basic framework being attached to a door frame and having an opening which receives a door glass, the glass run includes: a sealing member that seals between a vehicle inner side and a vehicle outer side of the door glass, wherein the bottom wall has a door glass lip which protrudes from a door glass surface of the bottom wall, and the door glass lip is harder than the bottom wall.

According to the first disclosed aspect, the bottom wall of the glass run has a door glass lip which protrudes from the door glass surface of the bottom wall, and the door glass lip is harder than the bottom wall, and thus, the rigidity of the glass run, which includes the bottom wall, is increased, allowing the vibration energy of the door glass to flow and dissipate efficiently when the glass run is in contact with the door glass. As a result, the noise caused by wind noise is reduced.

Here, the "rigidity of the glass run" is expressed by an amount of increase in a reaction force from the glass run with respect to an amount of displacement of an area where the door glass presses the glass run. Accordingly, when "the rigidity of the glass run increases", a slope (gradient) increases in a relationship between the displacement and the reaction force.

In impedance matching between the door glass and the glass run, presumably, impedance of the door glass is dominated by mass of the door glass, and impedance of the glass run is dominated by the rigidity of the glass run. In a high frequency range of 2 kHz or higher, in which the glass run is expected to reduce the noise, the impedance of the door glass is greater than the impedance of the glass run. Accordingly, with the increased rigidity of the glass run, the impedance of the glass run may be closer or equivalent to the impedance of the door glass; and this impedance matching may allow the vibration energy of the door glass to efficiently flow to the glass run to dissipate. As a result, the noise caused by wind noise may be reduced.

According to a second disclosed aspect, a glass run has a basic framework with a bottom wall, a vehicle outer side wall, and a vehicle inner side wall, the basic framework being attached to a door frame and having an opening which receives a door glass, the glass run includes: a sealing member that seals between a vehicle inner side and a vehicle outer side of the door glass, wherein the bottom wall has: a door glass lip which protrudes from a door glass surface of the bottom wall; and a door glass bulge which is interposed between the bottom wall and the door glass lip, and at least one of the door glass lip and the door glass bulge is harder than the bottom wall.

According to the second disclosed aspect, the bottom wall of the glass run has: the door glass lip which protrudes from the door glass surface of the bottom wall; and the door glass bulge which is interposed between the bottom wall and the door glass lip, and at least one of the door glass lip and the door glass bulge is harder than the bottom wall, and thus, the rigidity of the glass run, which includes the bottom wall, is increased, and the contact area between the bottom wall and the door glass lip is increased, allowing the vibration energy of the door glass to flow and dissipate efficiently when the glass run is in contact with the door glass. As a result, the noise caused by wind noise is reduced.

According to a third disclosed aspect, a glass run has a basic framework with a bottom wall, a vehicle outer side wall, and a vehicle inner side wall, the basic framework being attached to a door frame and having an opening which receives a door glass, the glass run includes: a sealing member that seals between a vehicle inner side and a vehicle outer side of the door glass, wherein the bottom wall has a door glass lip which protrudes from a door glass surface of the bottom wall, and the bottom wall has a hard portion at a portion in contact with the door glass lip, the hard portion being harder than the bottom wall except for the portion in contact with the door glass lip.

According to the third disclosed aspect, the bottom wall of the glass run has the door glass lip which protrudes from the door glass surface of the bottom wall, and the bottom wall has the hard portion at the portion in contact with the door glass lip, the hard portion being harder than the bottom wall except for the portion in contact with the door glass lip, and thus, the rigidity of the glass run, which includes the bottom wall, is increased, allowing the vibration energy of the door glass to flow and dissipate efficiently when the glass run is in contact with the door glass. As a result, the noise caused by wind noise is reduced.

According to a fourth disclosed aspect, a glass run has a basic framework with a bottom wall, a vehicle outer side wall, and a vehicle inner side wall, the basic framework being attached to a door frame and having an opening which receives a door glass, the glass run includes: a sealing member that seals between a vehicle inner side and a vehicle outer side of the door glass, wherein the bottom wall has: a door frame lip which protrudes from a door frame surface of the bottom wall; and a door frame bulge which bulges out from the door frame surface of the bottom wall to the door frame, and the door frame bulge is harder than the bottom wall.

According to the fourth disclosed aspect, the bottom wall of the glass run has the door frame lip which protrudes from the door frame surface of the bottom wall, and thus, the door frame lip allows sealing between the door frame and the bottom wall. In addition, the bottom wall has the door frame bulge which bulges out from the door frame surface of the bottom wall to the door frame, and the door frame bulge is harder than the bottom wall, and thus, the rigidity of the glass run, which includes the bottom wall, is increased, allowing the vibration energy of the door glass to flow and dissipate efficiently when the glass run is in contact with the door glass as compared with the case of the bottom wall of the related art. As a result, the noise caused by wind noise is reduced while maintaining the sealing performance.

According to a fifth disclosed aspect, at the fourth disclosed aspect, the door frame bulge of the glass run is interposed between the bottom wall and the door frame lip.

According to the fifth disclosed aspect, the door frame bulge is interposed between the bottom wall and the door frame lip, and thus, the rigidity of the glass run, which includes the bottom wall, is increased, and the contact area between the bottom wall and the door glass lip is increased, allowing the vibration energy of the door glass to flow and dissipate efficiently when the glass run is in contact with the door glass. As a result, the noise caused by wind noise is reduced while maintaining the sealing performance.

DETAILED DESCRIPTION OF PREFERRED EMBODIMENTS

Figure 1:
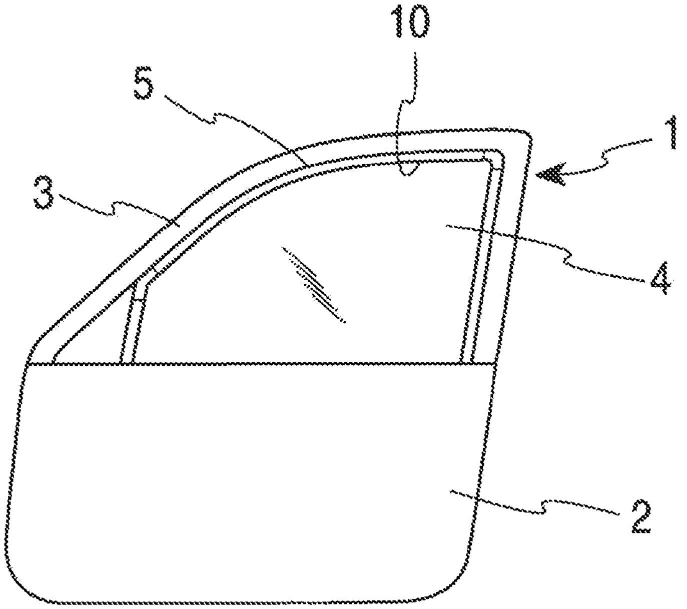
FIG. 1 is a front view of a door for an automobile.

A first embodiment of the present invention will be described with reference to FIGS. 1 to 5. FIG. 1 is a front view of a front door 1 on a left side of the automobile as seen from a vehicle outer side. The front door 1 includes a door body 2, and a door frame 3 attached to an upper edge of the door body 2. The door frame 3 and the upper edge of the door body 2 form a window opening. A glass run 10 is attached to the door frame 3 and the inside of the door body 2 to guide an up and down movement of a door glass 4. The present invention is applicable not only to the front door 1 on the left side but also to a front door on a right side, rear doors on left and right sides. Further, the present invention is applicable to a sliding door at which the door glass moves up and down.

Figure 2:
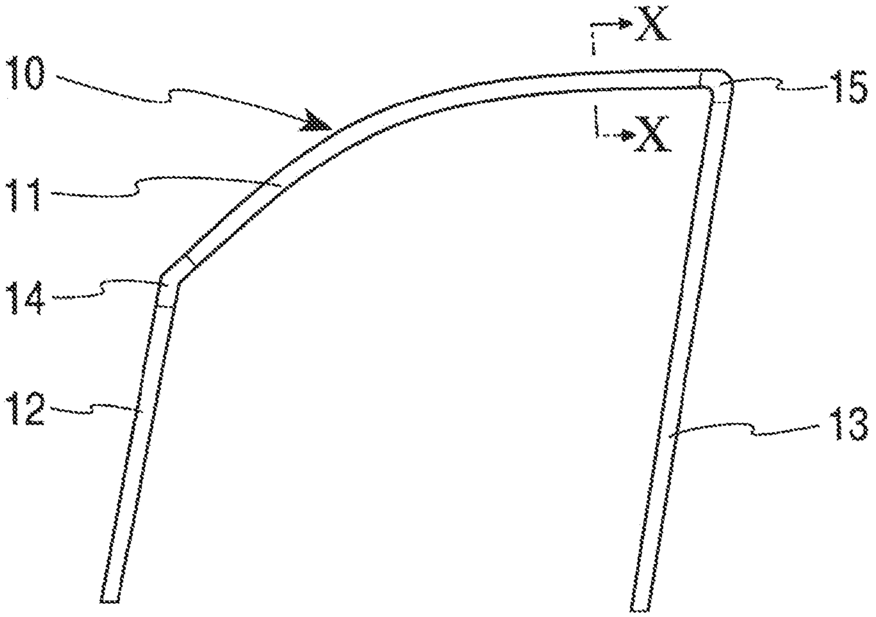
FIG. 2 is a front view illustrating a glass run used for a door frame in FIG. 1.

FIG. 2 is a simplified front view of the glass run 10 alone, as seen from the vehicle outer side. The glass run 10 includes a first extruded portion 11 corresponding to a lateral frame of the door frame 3, a second extruded portion 12 corresponding to a vertical frame of the door frame 3 on a front side of the front door 1, and a third extruded portion 13 corresponding to a vertical frame of the door frame 3 on a rear side of the front door 1. A front end of the first extruded portion 11 is connected to an upper end of the second extruded portion 12 by a first molded portion 14. A rear end of the first extruded portion 11 is connected to an upper end of the third extruded portion 13 by a second molded portion 15.

Figure 3:
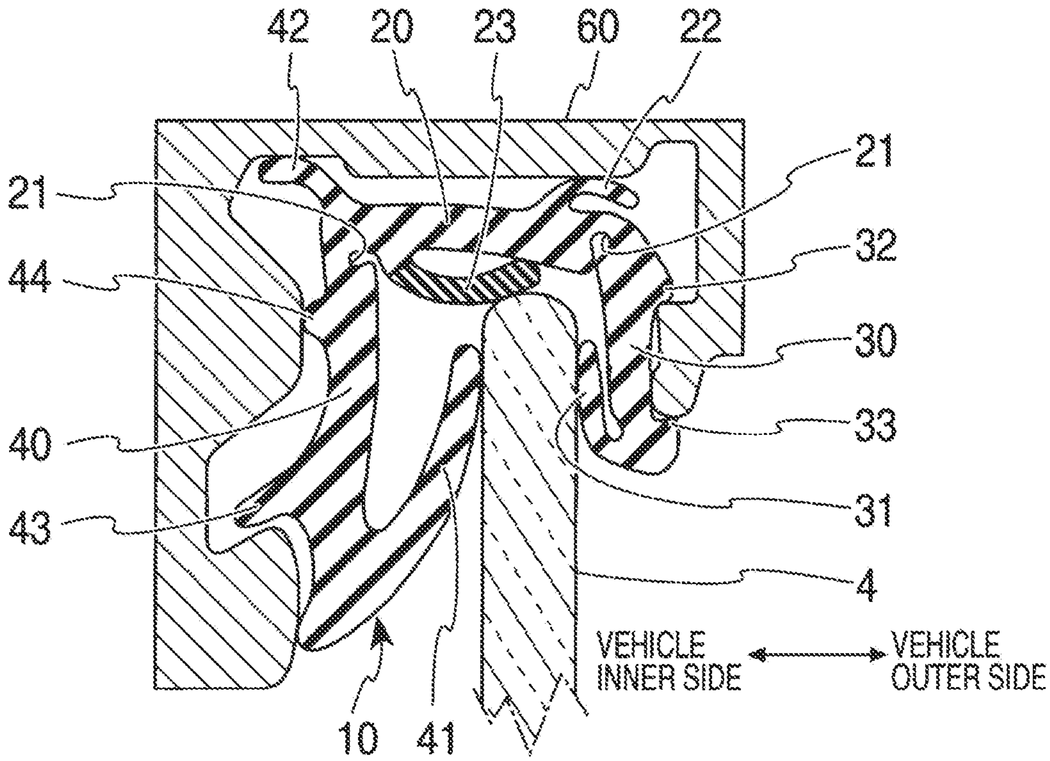
FIG. 3 is a sectional view of a glass run according to a first embodiment of the present invention, taken along line X-X in FIG. 2.

FIG. 3 is a sectional view at a time when the door glass 4 is closed, taken along line X-X in FIG. 2. FIG. 3 is also a sectional view of the glass run 10 attached to a jig 60 to measure an effect to be described later. The jig 60 has an inner surface shaped to trace a shape of the door frame 3, to which the glass run 10 is to be attached when being attached to the vehicle. The glass run 10 has a basic framework with a bottom wall 20, a vehicle outer side wall 30, and a vehicle inner side wall 40, and is formed in a channel shape (having a substantially U-shaped section). The bottom wall 20, the vehicle outer side wall 30, and the vehicle inner side wall 40 are connected to be expandable in a free state by a groove 21 on a vehicle outer side and a groove 21 on a vehicle inner side.

The bottom wall 20 is formed in a substantially plate shape. In addition, a door frame lip 22 is formed on the jig inner surface (door frame) side of the bottom wall 20 to seal between the jig inner surface (door frame) and the bottom wall 20. On the other hand, on a door glass surface of the bottom wall 20, a door glass lip 23 protrudes toward the door glass 4. The door glass lip 23 has a curved shape, projecting toward the door glass 4, and the door glass side of the door glass lip 23 is in contact with the door glass 4. In the first embodiment, the hardness of the door glass lip 23 is higher than the hardness of the bottom wall 20.

On the vehicle inner side of the vehicle outer side wall 30, a vehicle outer seal lip 31 protrudes from a tip of the vehicle outer side wall 30 toward the vehicle inner side and toward the bottom wall 20 to slide with the door glass 4. On the vehicle outer side of the vehicle outer side wall 30, a first fastening portion 32 and a second fastening portion 33 are formed to sandwich the inner surface of the jig 60 having a bent shape.

On the vehicle outer side of the vehicle inner side wall 40, a vehicle inner seal lip 41 protrudes from a tip of the vehicle inner side wall 40 toward the vehicle outer side and toward the bottom wall 20 to slide with the door glass 4. On the vehicle inner side of the vehicle inner side wall 40, a first holding lip 42, a second holding lip 43 and an abutting rib 44 are formed to hold the inner surface of the jig 60 having the bent shape.

Therefore, the sealing members that seal the vehicle inner side and the vehicle outer side of the door glass 4 are the vehicle inner seal lip 41 and the vehicle outer seal lip 31.

In the first embodiment, the glass run 10 excluding the door glass lip 23 is produced by extrusion molding using an olefinic thermoplastic elastomer (TPO) with an international rubber hardness (IRHD) of 80±5, and the door glass lip 23 is produced by extrusion molding using a TPO with an IRHD of 100±5.

When the door glass 4 is closed, as illustrated in FIG. 3, the vehicle outer seal lip 31 is in elastic contact with a vehicle outer surface of the door glass 4; the vehicle inner seal lip 41 is in elastic contact with the vehicle inner surface of the door glass 4; and the door glass lip 23 is in elastic contact with a tip of the door glass 4. Further, a tip of the door glass lip 23 is in contact with the bottom wall 20. Further, the tip of the door glass lip 23 does not need to abut the bottom wall 20.

Figure 4:
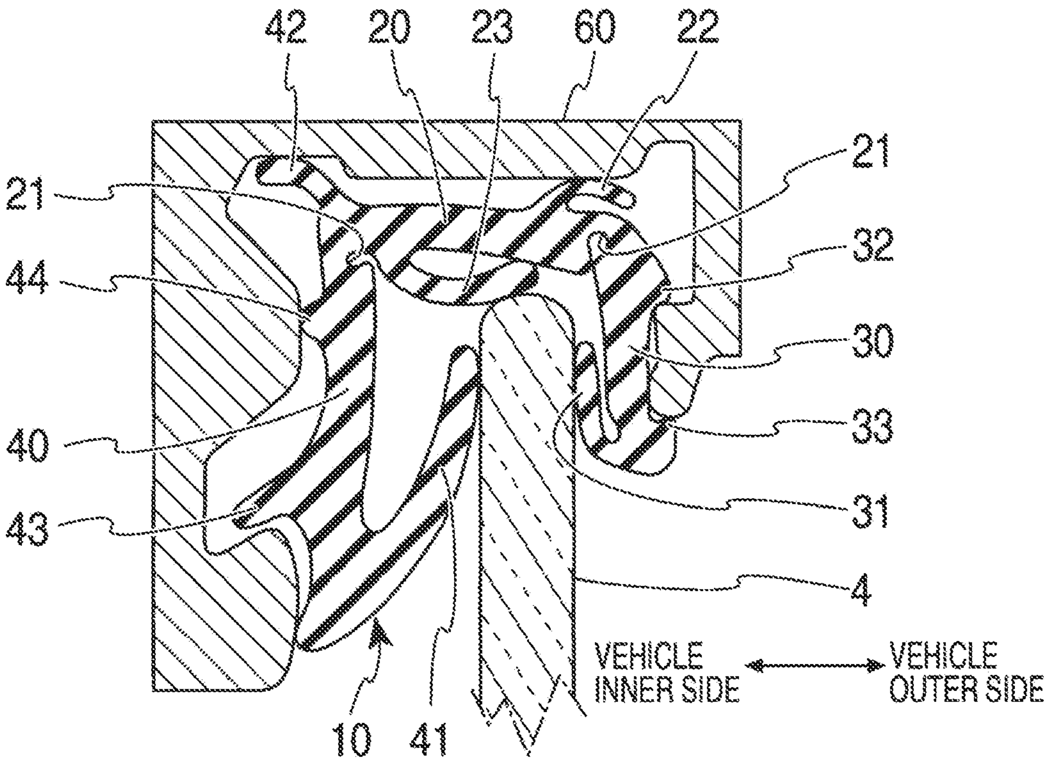
FIG. 4 is a sectional view of a glass run according to a comparative example, taken along line X-X in FIG. 2.

FIG. 4 is a comparative example of the glass run 10, which has the same shape as in FIG. 3 with the door glass lip 23 also made of the same material as the other parts of FIG. 3.

Figure 5:
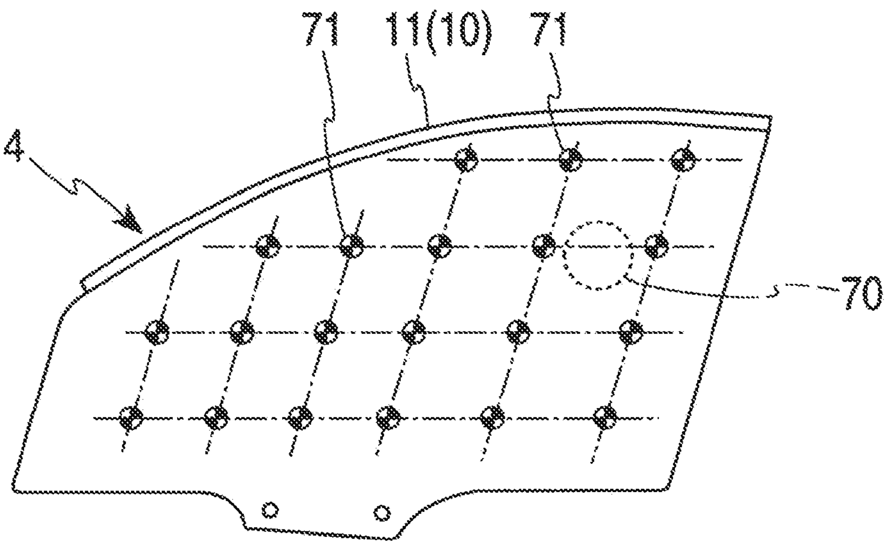
FIG. 5 illustrates measurement of a noise.

FIG. 5 illustrates measurement of the noise. A sound source 70 is placed at a position of a human ear (illustrated with a circle in a broken line in FIG. 5) in the passenger compartment of the vehicle. An acceleration pick-up 71 (vibration level meter) is attached to a vehicle outer side of the door glass 4 at twenty different points to receive the vibration of the door glass 4. The acceleration pick-up 71 is a sensor of the vibration level meter, and outputs an electric signal proportional to the vibration acceleration. As illustrated in FIG. 5, the glass run 10, having the first extruded portion 11 of FIG. 2 and having the section illustrated in FIGS. 3 and 4, is attached to a position of the lateral frame of the door glass 4 at the upper part of the vehicle. Then, noise is measured.

Frequency characteristics felt by the human ears are isomorphic and thus, an octave analysis is applied. In a frequency range of audible frequency to the noise, a sound pressure level for each frequency band is measured through a band pass filter specified in ⅓ octave band analysis. See JIS C 1513:2002 for the band pass filter characteristics or the like.

As a result of the measurement of the noise, with the first embodiment, the noise is effectively reduced in a range of 2 kHz to 5 kHz inclusive, as compared with the result of the measurement with the glass run 10 of FIG. 4.

It is considered that the above effect is the result based on the fact that in the glass run 10, by increasing the hardness of the door glass lip 23, the difference in rigidity between the door glass lip 23 and the door glass 4 is reduced and the vibration energy of the door glass 4 efficiently flows (transmits) to the door glass lip 23, that is, to the glass run 10, and dissipates by impedance matching. As a result, the noise caused by wind noise is reduced.

In the present invention, no material modification is required of the basic framework of the glass run 10, and no adverse effect is to be made on other performances of the glass run 10 (e.g., attachability to the door frame 3, sealing performance with the door glass 4 for prevention of any inclusion of foreign substances such as raindrops or dust).

Figure 6:
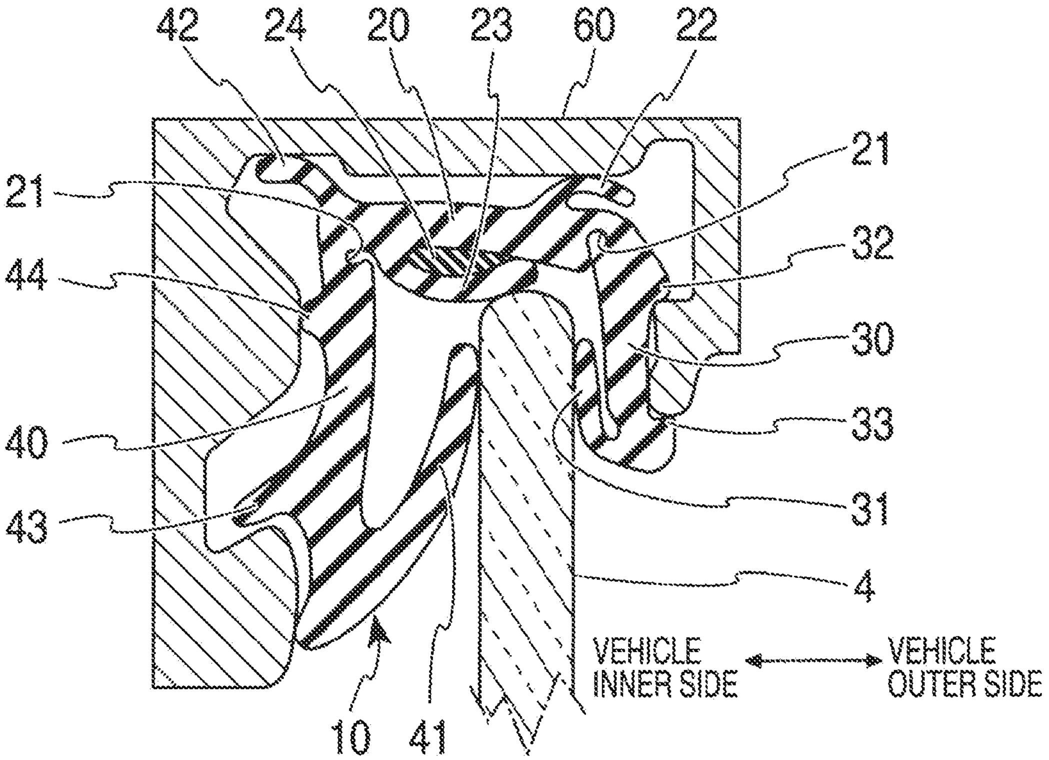
FIG. 6 is a sectional view of a glass run according to a second embodiment of the present invention, taken along line X-X in FIG. 2.

FIG. 6 is a sectional view according to a second embodiment of the present invention, taken along line X-X in FIG. 2. FIG. 6, as in the first embodiment, is also a sectional view of the glass run 10 attached to the jig 60 to measure an effect. The differences between the second embodiment and the first embodiment described above are, first, in that a door glass bulge 24 is formed between the bottom wall 20 and the door glass lip 23 and the hardness of the door glass bulge 24 is higher than the hardness of the bottom wall 20, and second, in that the hardness of the door glass lip 23 is the same as the hardness of the bottom wall 20. Other parts, such as the vehicle outer side wall 30, are the same as in FIG. 3. The hardness of the door glass bulge 24 is the same as the hardness of the door glass lip 23 (FIG. 3) of the first embodiment.

The door glass bulge 24 is formed on the door glass surface of the bottom wall 20 and is not in contact with the door glass lip 23 when the glass run 10 is mounted on the jig 60 (door frame 3 when mounted on a vehicle). The door glass bulge 24 may be in contact with the root of the door glass lip 23 when the glass run 10 is mounted on the jig 60 (door frame 3 when mounted on a vehicle).

Here, about the hardness of the door glass bulge 24 and the hardness of the door glass lip 23, it is sufficient that the hardness of at least one of the door glass bulge 24 and the door glass lip 23 is higher than the hardness of the bottom wall 20. Thus, in addition to the above, cases where the hardness of the door glass bulge 24 is the same as the hardness of the bottom wall 20 and the hardness of the door glass lip 23 is higher than the hardness of the bottom wall 20 and cases where both the hardness of the door glass bulge 24 and the hardness of the door glass lip 23 are higher than the hardness of the bottom wall 20 are included.

When the door glass 4 is closed, as illustrated in FIG. 6, the door glass lip 23 of the glass run 10 is in elastic contact with the tip of the door glass 4, and the door glass lip 23 is in surface contact with the door glass bulge 24.

As a result of the measurement of the noise, with the second embodiment, the noise is effectively reduced in a range of 2 kHz to 5 kHz inclusive, as compared with the result of the measurement with the glass run 10 of FIG. 4. In addition, an effective reduction of 0.3 dB has been confirmed at 2 kHz. Therefore, by interposing the door glass bulge 24, which is harder than the bottom wall 20, between the bottom wall 20 and the door glass lip 23, the contact area between the bottom wall 20 and the door glass lip 23 is increased and the vibration energy of the door glass 4 can efficiently flow and dissipate when the glass run 10 is in contact with the door glass 4. As a result, the noise caused by wind noise is reduced.

Figure 7:
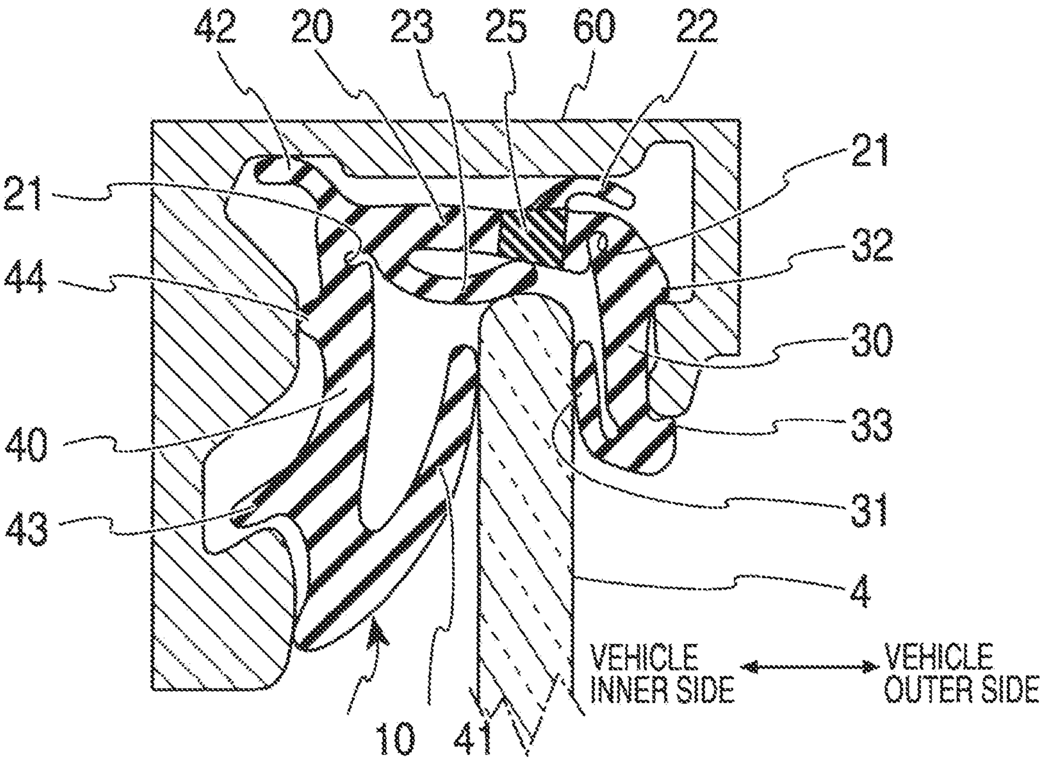
FIG. 7 is a sectional view of a glass run according to a third embodiment of the present invention, taken along line X-X in FIG. 2.

FIG. 7 is a sectional view according to a third embodiment of the present invention, taken along line X-X in FIG. 2. FIG. 7, as in the first embodiment, is also a sectional view of the glass run 10 attached to the jig 60 to measure an effect. The differences between the third embodiment and the first embodiment described above are, first, in that the hardness of the door glass lip 23 is the same as the hardness of the bottom wall 20, and second, in that in the bottom wall 20, the portion in contact with the door glass lip 23 has a hardened hard portion 25 that is harder than the bottom wall 20 except for the portion in contact with the door glass lip 23. In FIG. 7, the hard portion 25 is formed through the bottom wall 20 from the door glass 4 side to the jig 60 side (door frame side), but the hard portion 25 may also be formed on the door glass lip 23 side without penetration. Furthermore, the hard portion 25 may be formed separately on the door glass lip 23 side of the bottom wall 20 and on the jig 60 side (door frame side).

As a result of the measurement of the noise, with the third embodiment, the noise is effectively reduced in a range of 2 kHz to 5 kHz inclusive, as compared with the result of the measurement with the glass run 10 of FIG. 4. Therefore, the vibration energy of the door glass 4 can efficiently flow and dissipate when the glass run 10 is in contact with the door glass 4. As a result, the noise caused by wind noise is reduced.

Figure 8:
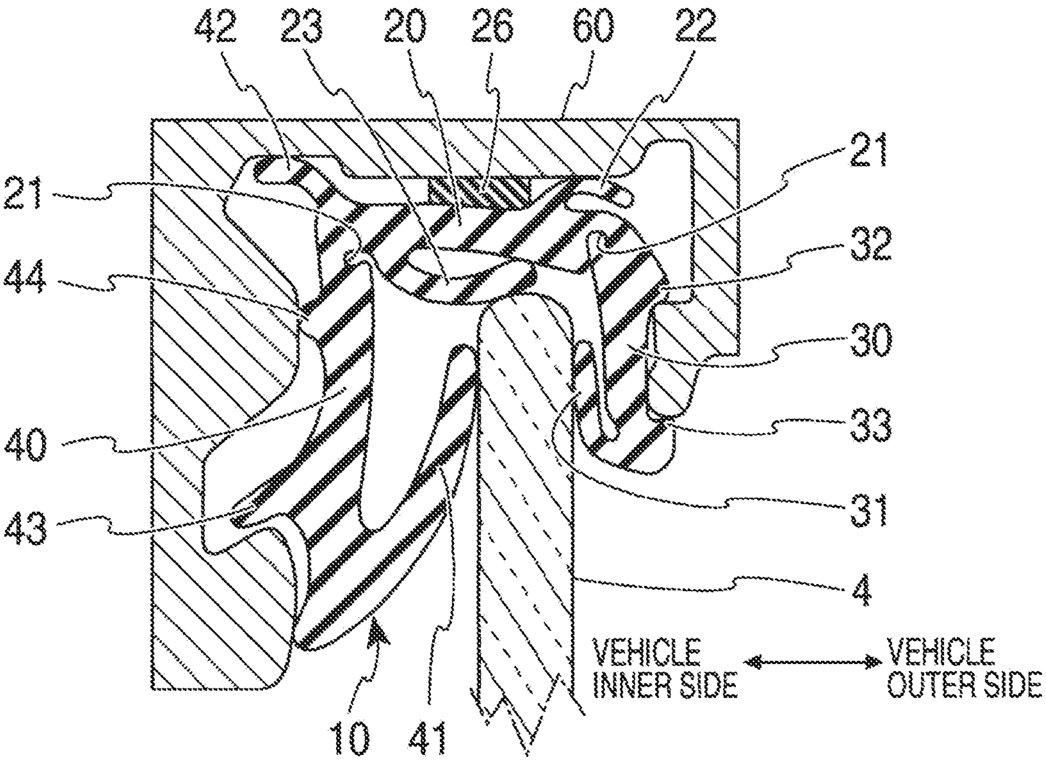
FIG. 8 is a sectional view of a glass run according to a fourth embodiment of the present invention, taken along line X-X in FIG. 2.

FIG. 8 is a sectional view according to a fourth embodiment of the present invention, taken along line X-X in FIG. 2. FIG. 8, as in the first embodiment, is also a sectional view of the glass run 10 attached to the jig 60 to measure an effect. The differences between the fourth embodiment and the first embodiment described above are, first, in that the hardness of the door glass lip 23 is the same as the hardness of the bottom wall 20, and second, in that the bottom wall 20 has a door frame bulge 26 that protrudes from the jig 60 side (door frame side) surface of the bottom wall 20 to the jig 60 side (door frame side) and is harder than the bottom wall 20. The door frame bulge 26 is in contact with the jig 60 (door frame 3) when mounted on the jig 60 (door frame 3 when mounted on a vehicle).

As a result of the measurement of the noise, with the fourth embodiment, the noise is effectively reduced in a range of 2 kHz to 5 kHz inclusive, as compared with the result of the measurement with the glass run 10 of FIG. 4. Therefore, by forming the door frame bulge 26, the vibration energy of the door glass 4 can efficiently flow and dissipate. As a result, the noise caused by wind noise is reduced.

Figure 9:
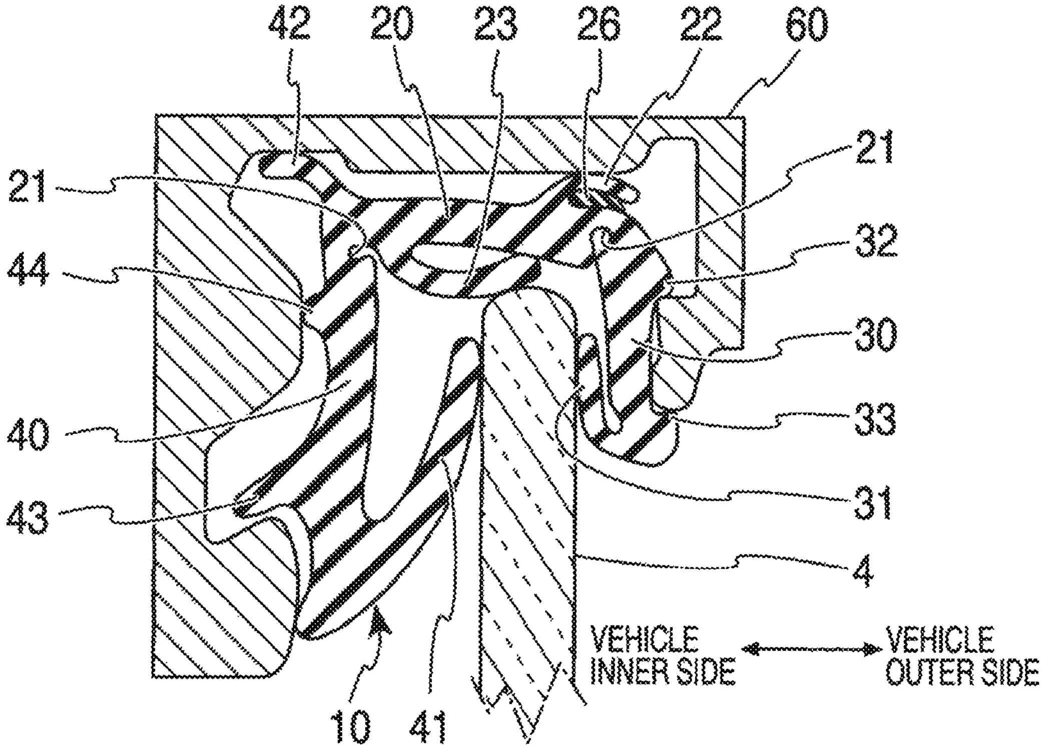
FIG. 9 is a sectional view of a glass run according to a fifth embodiment of the present invention, taken along line X-X in FIG. 2.
Figure 10:
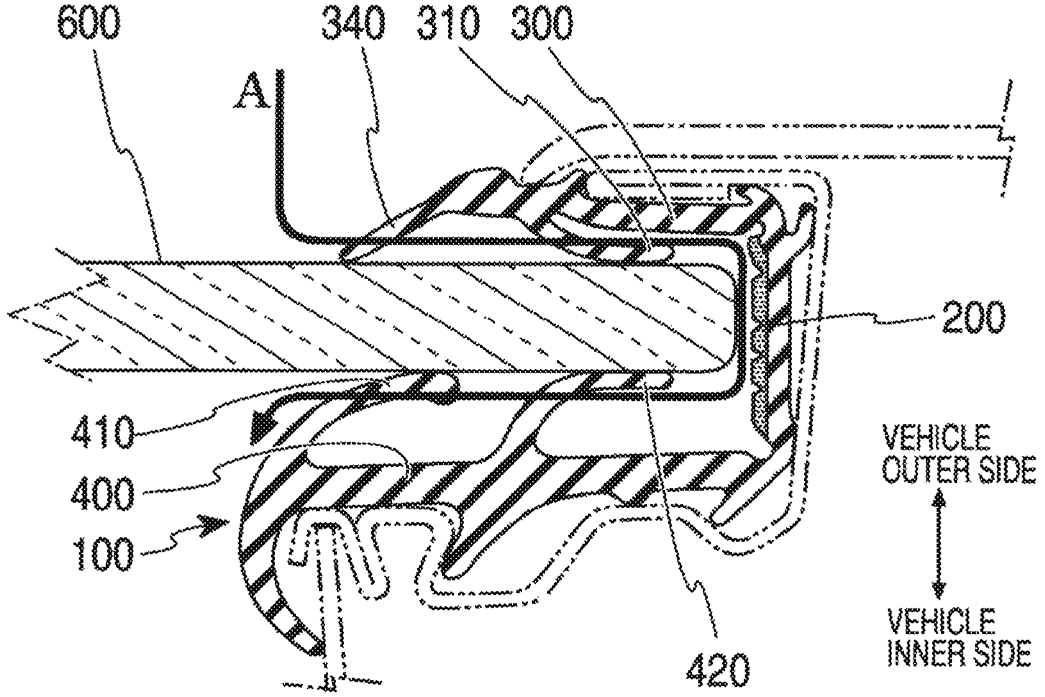
FIG.10 Prior Art
FIG. 10 is a sectional view of a structure of a conventional glass run to be attached (Japanese Patent Application Laid-Open No. 2021-24388).

FIG. 9 is a sectional view according to a fifth embodiment of the present invention, taken along line X-X in FIG. 2. FIG. 9, as in the first embodiment, is also a sectional view of the glass run 10 attached to the jig 60 to measure an effect. The difference between the fifth embodiment and the fourth embodiment described above is in that the door frame bulge 26, which is rigid, is interposed between the bottom wall 20 and the door frame lip 22.

The door frame bulge 26 is formed on the surface on the jig 60 side of the bottom wall 20, and in FIG. 9, the door frame bulge 26 is in surface contact with the door frame lip 22. When the glass run 10 is mounted on the jig 60 (door frame 3 when mounted on a vehicle), the door frame bulge 26 may be in surface contact, partially in contact, or not in contact with the door frame lip 22.

As a result of the measurement of the noise, with the fifth embodiment, the noise is effectively reduced in a range of 2 kHz to 5 kHz inclusive, as compared with the result of the measurement with the glass run 10 of FIG. 4. Therefore, by interposing the door frame bulge 26 between the bottom wall 20 and the door frame lip 22, the vibration energy of the door glass 4 can efficiently flow and dissipate. As a result, the noise caused by wind noise is reduced.

In the embodiments of the present invention, the glass run 10 may be formed of rubber, thermoplastic elastomer, soft synthetic resin, or others. From viewpoints of weather resistance, recycling, cost, or others, as the rubber, ethylene propylene diene rubber (EPDM) is preferable, and as the thermoplastic elastomer, olefinic thermoplastic elastomer (TPO) or dynamic cross-linking thermoplastic elastomer (TPV) is preferable.

The present invention is not limited to the foregoing embodiments, and various modifications may be made within a range not deviating from the object of the present invention.

For example, in the third to fifth embodiments described above, the hardness of the door glass lip 23 is the same as the hardness of the bottom wall 20, but as in the first embodiment, the hardness of the door glass lip 23 may be higher than the hardness of the bottom wall 20.

What is claimed is:

1. A glass run, comprising:

a basic framework having a bottom wall, a vehicle outer side wall, and a vehicle inner side wall, the basic framework being attachable to a door frame and having an opening which is configured to receive a door glass; and a sealing member that seals between a vehicle inner side and a vehicle outer side of the door glass, wherein the bottom wall has a door glass lip which protrudes from a door glass surface of the bottom wall, the door glass lip having a curved shape, projecting toward the door glass, the door glass lip is configured such that when the door glass is in a closed position, the door glass lip is in elastic contact with a tip of the door glass, and the door glass lip is in surface contact with the bottom wall, and the entire door glass lip is harder than the bottom wall.

2. A glass run, comprising:

a basic framework having a bottom wall, a vehicle outer side wall, and a vehicle inner side wall, the basic framework being attachable to a door frame and having an opening which is configured to receive a door glass; and a sealing member that seals between a vehicle inner side and a vehicle outer side of the door glass, wherein the bottom wall has a door glass lip which protrudes from a door glass surface of the bottom wall from a root connected to the bottom wall and extending to a tip of the door glass lip, the door glass lip having a curved shape, projecting toward the door glass, a door glass bulge which is interposed between the bottom wall and the door glass lip, the door glass lip is configured such that when the door glass is in a closed position, the door glass lip is in elastic contact with a tip of the door glass, and the tip of the door glass lip is in surface contact with the door glass bulge, and the door glass bulge is harder than the bottom wall and is in contact with the root of the door glass lip when the glass run is mounted on the door frame.

3. A glass run, comprising:

a basic framework having a bottom wall, a vehicle outer side wall, and a vehicle inner side wall, the basic framework being attachable to a door frame and having an opening which is configured to receive a door glass; and a sealing member that seals between a vehicle inner side and a vehicle outer side of the door glass, wherein in an area corresponding to a lateral frame of the door frame, the bottom wall has a door glass lip which protrudes from a door glass surface of the bottom wall, the door glass lip having a curved shape, projecting toward the door glass, and the bottom wall has a hard portion at a location in contact with the door glass lip, the hard portion being harder than the rest of the bottom wall and being formed through the bottom wall from the door glass side to the door frame side.

4. A glass run, comprising:

a basic framework having a bottom wall, a vehicle outer side wall, and a vehicle inner side wall, the basic framework being attachable to a door frame and having an opening which is configured to receive a door glass; and a sealing member that seals between a vehicle inner side and a vehicle outer side of the door glass, wherein the bottom wall has a door frame lip which protrudes from a door frame surface of the bottom wall, the door glass lip having a curved shape, projecting toward the door glass, and a door frame bulge which bulges out from the door frame surface of the bottom wall to the door frame, and the door frame bulge is harder than the bottom wall and is in contact with the door frame when the glass run is mounted on the door frame.

5. The glass run according to claim 4, wherein the door frame bulge is interposed between the bottom wall and the door frame lip.

* * * * *